Aug. 3, 1965 R. D. ALLUM ETAL 3,199,083

ARRANGEMENTS FOR HANDLING BINARY NUMBERS

Filed Aug. 18, 1960

8 Sheets-Sheet 1

INVENTORS.
ROBIN DEVENISH ALLUM
VICTOR EDMUND MANN
DAVID GERALD BRYAN
BY RONALD GEORGE KNIGHT

Irwin S. Thompson
ATTY.

INVENTORS
ROBIN DEVENISH ALLUM.
VICTOR EDMUND MANN.
DAVID GERALD BRYAN
RONALD GEORGE KNIGHT
BY
[signature]
ATTY.

Aug. 3, 1965 R. D. ALLUM ETAL 3,199,083

ARRANGEMENTS FOR HANDLING BINARY NUMBERS

Filed Aug. 18, 1960 8 Sheets-Sheet 3

INVENTORS
ROBIN DEVENISH ALLUM
VICTOR EDMUND MANN
DAVID GERALD BRYAN
BY RONALD GEORGE KNIGHT

Irwin S. Thompson
ATTY.

Aug. 3, 1965 R. D. ALLUM ETAL 3,199,083

ARRANGEMENTS FOR HANDLING BINARY NUMBERS

Filed Aug. 18, 1960 8 Sheets-Sheet 4

INVENTORS
ROBIN DEVENISH ALLUM,
VICTOR EDMUND MANN,
DAVID GERALD BRYAN,
BY RONALD GEORGE KNIGHT

Irwin S. Thompson
ATTY.

INVENTORS
ROBIN DEVENISH ALLUM
VICTOR EDMUND MANN
DAVID GERALD BRYAN
RONALD GEORGE KNIGHT
BY Irwin S. Thompson
ATTY.

Aug. 3, 1965 R. D. ALLUM ETAL 3,199,083

ARRANGEMENTS FOR HANDLING BINARY NUMBERS

Filed Aug. 18, 1960

8 Sheets-Sheet 6

INVENTORS
ROBIN DEVENISH ALLUM.
VICTOR EDMUND MANN.
DAVID GERALD BRYAN.
RONALD GEORGE KNIGHT.
BY
Irwin S. Thompson
ATTY.

INVENTORS
ROBIN DEVENISH ALLUM
VICTOR EDMUND MANN
DAVID GERALD BRYAN
RONALD GEORGE KNIGHT
BY
Irwin S. Thompson
ATTY.

INVENTORS
ROBIN DEVENISH ALLUM,
VICTOR EDMUND MANN,
DAVID GERALD BRYAN,
RONALD GEORGE KNIGHT.
BY
Irwin S. Thompson
ATTY.

3,199,083
ARRANGEMENTS FOR HANDLING BINARY NUMBERS

Robin Devenish Allum, Liverpool, Victor Edmund Mann, Taplow, and David Gerald Bryan and Ronald George Knight, Aldwych, London, England, assignors to Automatic Telephone & Electric Company Limited, Liverpool, and Standard Telephones and Cables Limited, London, England Filed Aug. 18, 1960, Ser. No. 50,429
1 Claim. (Cl. 340—172.5)

Figure 1:
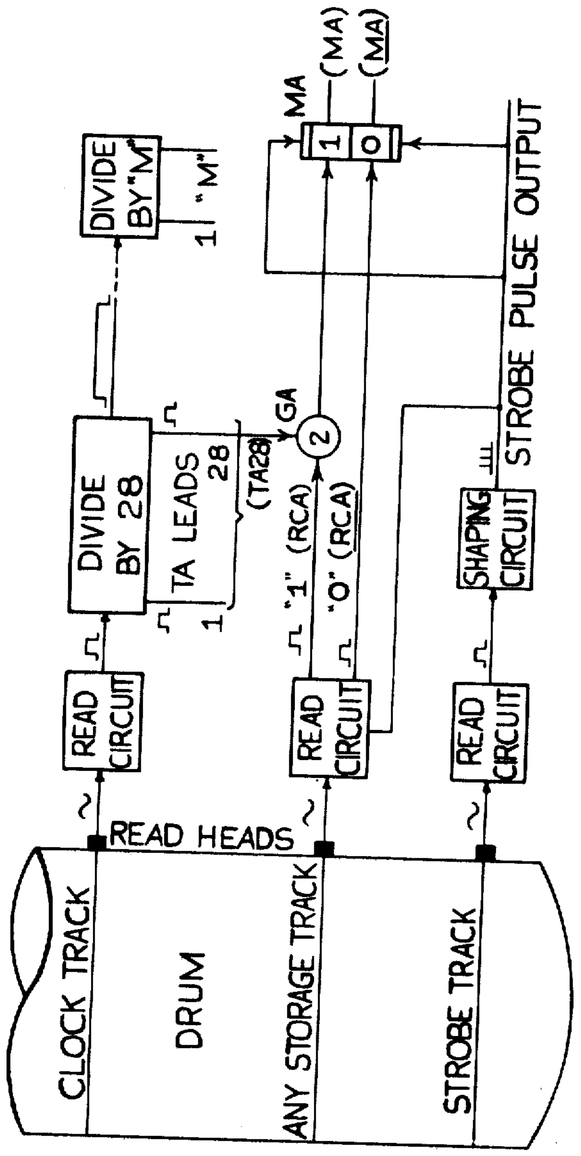

The present invention relates to arrangements for handling binary numbers and is more particularly concerned with arrangements which include a storage device for storing items of data in the form of binary numbers and which also include means for selecting required items of data.

The invention has particular application to control arrangements for telephone systems where a cyclic storage device stores information relating to subscribers' lines and/or interexchange junctions. It should, however, be clearly understood that the invention is not limited to such application but can also be used in other data handling arrangements. The following description is however concerned entirely with the application to a telephone system.

In most large automatic telephone systems, problems arise in connection with lines in P.B.X groups and with outgoing junction groups, for example the problem of extending such a group. If the selector switches accommodating the existing lines or junctions in such a group have no outlets available for extension, it must be extended on other switches, or transferred as a whole to another switch or switches with consequent changes to the numbering scheme. This problem is greatly simplified in common-control exchanges where lines or junctions in this type of "multiple appearance" group may be scattered over the equipment without disadvantage. Extension of a multiple appearance group then requires only that the equipment identity of the new lines or junctions is stored in the common control equipment.

This solution is a possible one in exchanges in which a storage device of the magnetic drum type is employed in common control equipment, the drum (or its equivalent disc or tape, or even a cathode ray tube store) being used to store information relating to each line and junction, such as its directory number, its equipment number, its class of service, its free or busy condition, and so on. When a connection is being set up, the appropriate information is read from the drum and used in making the physical connection or in allotting appropriate time or frequency channels. Hunting for a free line or junction in a multiple appearance group presents no difficulty with this arrangement, even when the various appearances are scattered at random over the exchange equipment, because the drum circuits merely have to recognise a "line free" indication associated with the address of the wanted group, to obtain the information required for setting up the connection.

A problem does arise, however, in exchanges of the type mentioned in the previous paragraph, in that when a hunt is being made for a free line or junction in a multiple appearance group, it is generally desirable to make the hunt in a definite order. The reason for this is that junctions in a group are often graded, and in the case of P.B.X lines it is usual to make the hunt in opposite directions for originating and terminating calls to avoid synchronous hunting over the lines from both ends.

One of the objects of the invention is to solve this latter problem and thus to provide, in a common-control exchange employing a magnetic drum store, means for hunting for a free line or junction in a multiple appearance group, of which the lines are given an order of priority for being taken into use, the hunting means ensuring that the highest priority free line is always found.

A further object of the invention is to provide circuit arrangements for selecting the highest value number from a plurality of binary numbers.

Another object of the invention is to provide a data processing system for handling data having sequential characteristics and for selecting an item of data having the superior position in the sequence.

According to the invention, in a circuit arrangement for selecting the highest value number from a plurality of binary numbers read simultaneously from a storage device, the numbers being read in serial form from the highest order binary digit to the lowest, for each number read simultaneously means for examining the value of each binary digit as it is read and means for remembering the previous binary digit are provided, and if a binary digit has a first value, the previous binary digit is examined and if this has the alternative value a common memory device is consulted which produces a signal if any binary digits read simultaneously with said previous binary digit had said first value and if such a signal is given, said first means discards the number being examined, whereas in all other circumstances the last-mentioned number is accepted.

According to one aspect of the invention, in a circuit arrangement for selecting the highest value number from a plurality of binary numbers read successively from a first storage device and for storing said highest value number on a second storage device, the numbers stored in both devices being read in serial form from the highest order binary digit to the lowest, there are provided first means for examining all the binary digits read from both storage devices and if a digit has a first value for writing it into said second storage device, second means for examining each binary digit as it is read from said first storage device and third means for remembering the previous binary digit read from said first storage device whereby if a binary digit has a first value, the previous binary digit is examined and if this has the alternative value said third means is consulted which produces a signal if a binary digit relative to a previously stored highest value number and read from said second storage device simultaneously with said previous binary digit has said first value and if such a signal is given said second means discards the number being examined whereas if a binary digit having said first value is transferred from said first storage device to said second storage device to replace a binary digit having the alternative value, fourth means change the value of the subsequent binary digits in said second storage device to said alternative value to enable a new number to be stored therein.

According to another aspect of the invention, a data processing system comprises a magnetic drum, storage areas arranged on tracks on the drum for storing items of data belonging to a particular sequence in random order, reading heads arranged to read data from the tracks, storage means for storing a selected item of data read from the drum, comparison means for comparing an item of data read from one track with an item of data read simultaneously from another track and also with the item of data stored in said storage means, means for transferring items of data from the reading heads to said storage means, first gating means controlled by said comparison means for restraining such transfer of an item of data when said comparison means indicates that said item of data occupies an inferior position in said sequence to an item of data read simultaneously from another track, second gating means controlled by said comparison means for restraining such transfer of an item of data when said comparison means indicates that said item of data occupies an inferior position in said sequence to an item of data stored in said storage means and means for replacing said item of data stored in said storage means by any item of data read from the drum which occupies a superior position in said sequence.

According to a further aspect of the invention, a telephone system has certain subscribers' lines and/or junctions arranged in groups each identified by the same group number, each line or junction in a group being allocated a priority number identifying its position in a predetermined order of priority for being taken into use and comprises a storage arrangement having storage areas for storing information identifying the group and priority number of each such line or junction, means for scanning the storage areas, means effective during a scan for determining the highest priority number of the available lines or junctions of a wanted group and a storage device for storing the highest priority number to enable the associated available line or junction to be taken into use.

Figure 2:
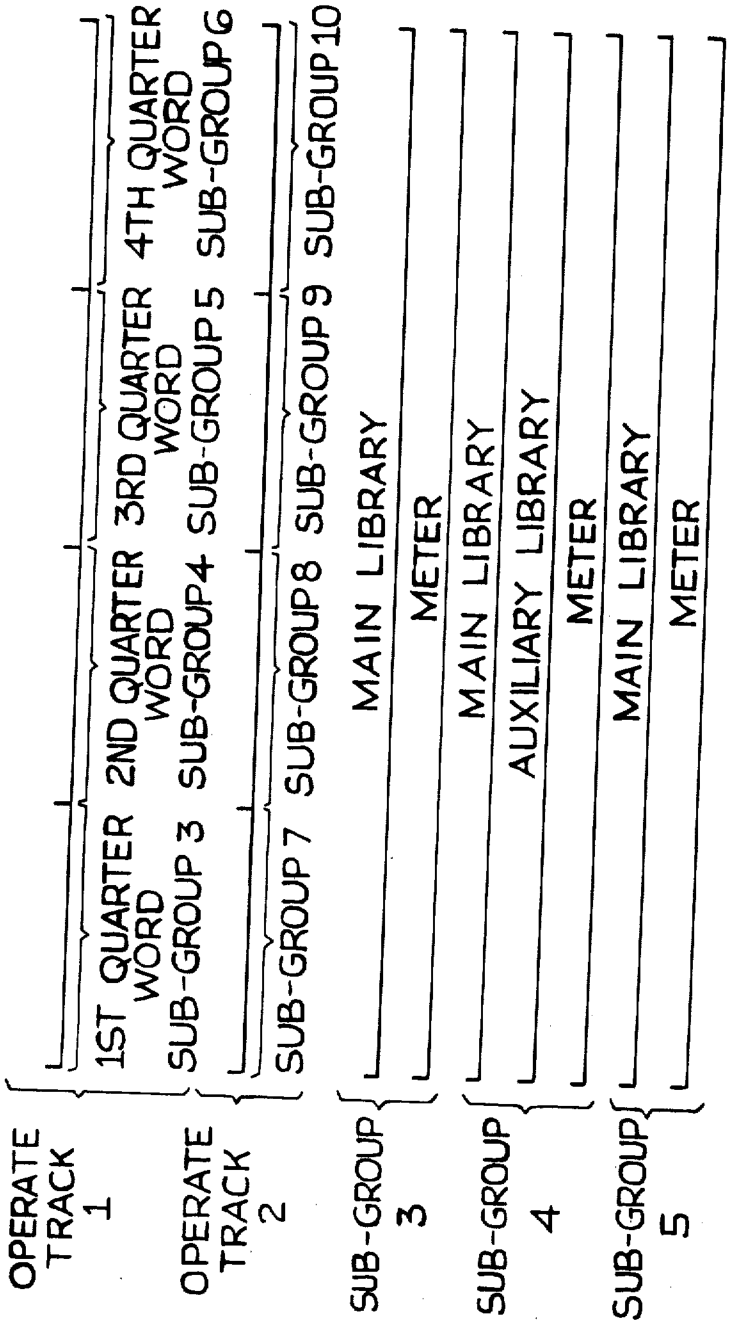
Figure 3:
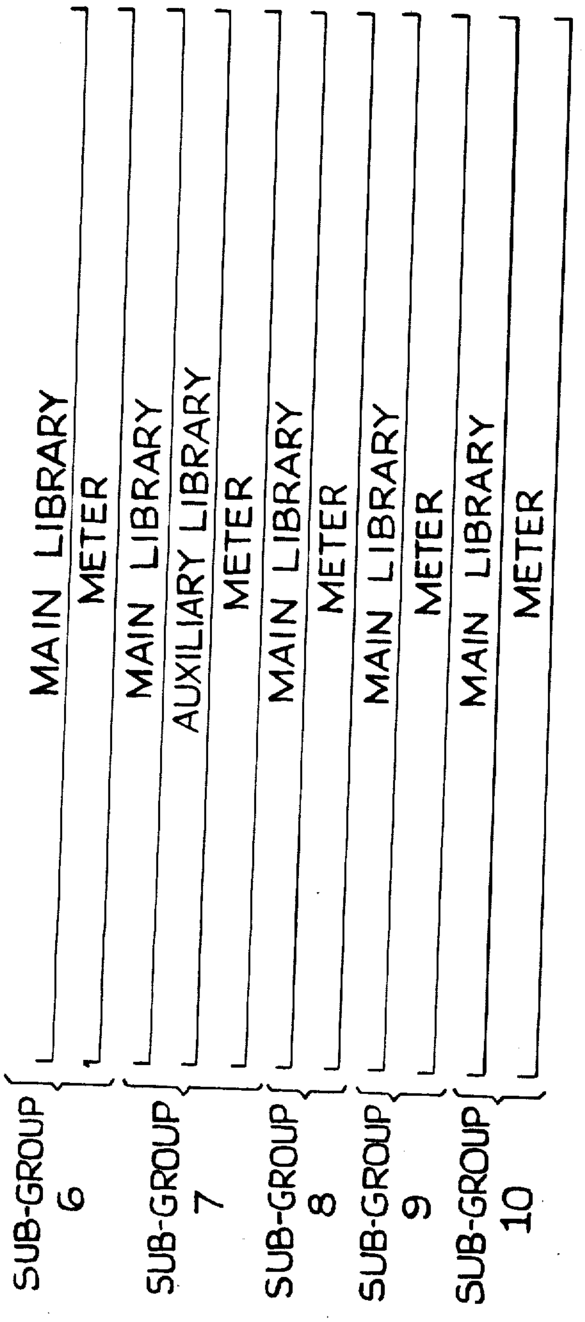
Figure 4:
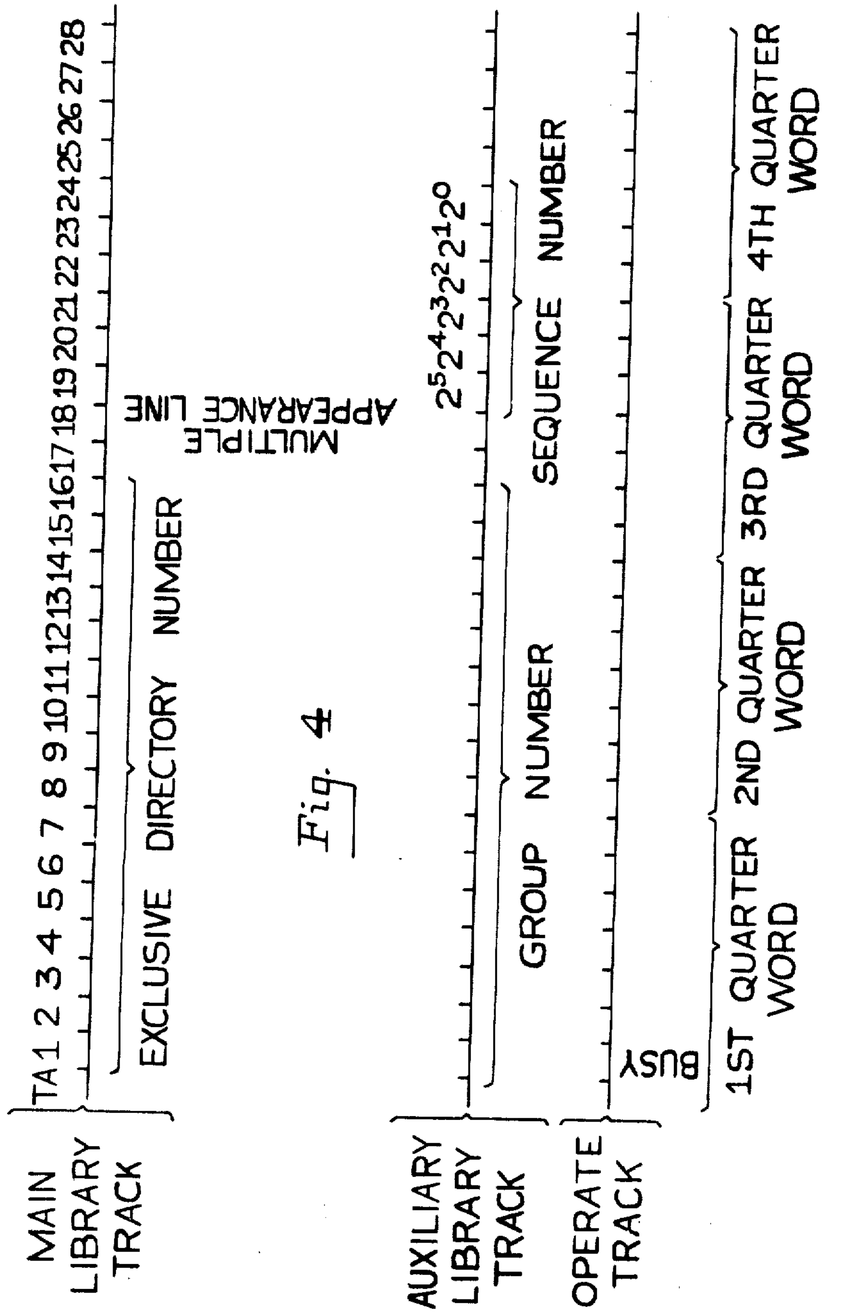

The invention will be better understood from the following description of one embodiment, which should be read in conjunction with the accompanying drawings comprising FIGS. 1–8. Of the drawings, FIG. 1 is a schematic diagram illustrating the reading of information from the magnetic drum store, FIGS. 2 and 3 when placed one above the other with FIG. 2 on top show the allocation of tracks on the drum to a group of lines and junctions, FIG. 4 shows the allocation of storage areas on these tracks for the stored information relevant to the present invention, FIGS. 5 and 6, which should be placed side by side with FIG. 5 on the left, comprises a block diagram showing the relationship of the circuits used in the invention, and FIGS. 7 and 8, when placed one above the other with FIG. 7 on top, show the circuits employed in the embodiment of the invention to be described.

*The magnetic drum store*

A large number of storage tracks are provided on the drum for the storage of information relating to subscribers' lines and incoming and outgoing junctions, each line and each junction having its own individual storage area which may include several tracks. Information relating to lines or junctions is stored on the drum in the form of binary signals, i.e. as "1" and "0" signals, and may be permanent, semi-permanent or transient. For example the subscriber's directory number is permanent information, a line fault indication may be regarded as semi-permanent, and a "busy" indication is transient information. Because at least some of the stored information has to be changed at intervals, both read and write heads are provided on all storage tracks. The writing of information on the drum does not fall within the scope of the present invention, and only the reading arrangements will be considered here.

Referring to FIG. 1, this drawing shows schematically the circuits required for reading from any information storage track, e.g. that labelled "Any Storage Track." A read head converts the magnetic signal representing the stored information into an electrical signal, which is generally sinusoidal in shape, and feeds it into a read circuit, which contains an amplifier and a squaring circuit. The output of the read circuit appears as a rectangular waveform on two alternative leads, the first lead being energized when a 1 signal is read from the drum, the second being energized when a 0 signal is read. The 1 and 0 signal outputs of a particular read circuit are identified by the same reference as the read circuit. If, for example, as shown in the drawing, the read circuit is designated RCA, the output lead for 1 signals would have the reference RCA, and the output lead for 0 signals would have the reference $\overline{\text{RCA}}$. The lead references are also used to distinguish signals appearing on these leads; thus, "a signal $\overline{\text{RCA}}$" means a 0 signal read from the drum and appearing at the output of the read circuit on lead $\overline{\text{RCA}}$.

Access to the individual storage areas on the drum is effected by means of a series of trains of clock pulses, which are derived from signals permanently stored on a clock track on the drum, and these pulse trains are thus rigidly synchronised with the rotation of the drum. The method of storing information on the storage tracks is such that the storage areas containing any particular items of information remain stationary with respect to the surface of the drum, and it is therefore possible to define any one of these storage areas in terms of particular pulses obtained from the clock circuits.

The clock track contains a signal waveform which has a complete cycle of oscillation corresponding to each elemental storage area on the storage tracks, and the read circuit for this track produces a series of square wave pulses, each having a duration corresponding to the time taken for an elemental storage area to pass under the read head of a storage track. These pulses are applied to a series of frequency dividing circuits, each of which comprises a cyclic counter having an output lead from each stage. The number of stages in each counter corresponds to the grouping of storage areas on the storage tracks. For example, supposing that all the information relating to a line can be accommodated in 28 elemental storage areas of "bits," then it would be convenient to have a cyclic pulse train defining the limits of this length of track, and the pulse train read from the clock track would first be fed into a counting circuit arranged to divide by 28. If, furthermore, in this example, 100 such 28-bit areas, or "words," can be accommodated in the circumference of the drum, the next counter in the dividing chain would have 100 stages. Subsequent counters might also be provided for the grouping of tracks, if tracks are read in sequence.

In the drawing, two counters in series are shown, the first being shown as having 28 stages and the last as having "M" stages. The output leads from the stages of the first counter are designated TA1–28, and an output pulse appears on each of these leads in turn, each pulse persisting for the time required for a single bit to pass under the read or write head of a storage track. The output pulses on a TA lead are designated with the same reference as that of the lead on which they appear; for example, pulses appearing on the first TA lead are referred to as TA1 pulses. The bits which pass under a reading or writing head during the appearance of each TA1 pulse are also defined by the reference TA1. In the case of the next counter in the frequency division chain, each of its output leads would produce pulses in turn of one word length, i.e. having a duration equal to that of 28 TA pulses. Subsequent counters in the frequency division chain have pulse outputs bearing a similar relation to those of the preceding circuit.

In complicated electronic switching systems it is necessary for switching operations which are intended to be simultaneous to be timed with great accuracy. The timing pulses described above and the pulses resulting from signals read from the drum may not be sufficiently sharply defined at their leading and trailing edges to satisfy the very accurate timing requirements of a complicated system and because of this, a system of strobing pulses is employed. These pulses are produced from signals permanently stored on a "strobe" track, the read circuit associated with this track performing an amplifying and squaring operation similar to the other read circuits. The square wave output signals of this read circuit are then applied to a shaping circuit which produces a train of accurately spaced pulses of very short duration, generally referred to as "strobe" pulses, which have the same recurrence frequency as that of the shortest clock pulses—the TA pulses. In practice, the "strobe" and "clock" tracks and their respective read circuits are normally combined, the frequency division circuits being driven from the strobe pulse source. In general, all the electronic switching circuits in the system are controlled from the strobe pulse source. For example, the read circuits of the storage tracks are switched between the 1 and 0 conditions with the aid of strobe pulses, so that the instants of change are sharply defined. In no case is a strobe pulse on its own capable of performing a switching operation, but it provides the triggering pulse necessary to switch a circuit from one condition to the other if the signal applied to the circuit requires such a change to be made. Moreover, the 1 and 0 signals themselves are incapable of performing a switching operation until a strobe pulse is applied to the switching circuit.

There are two main logical elements employed in the switching circuits in the present invention, the gate and the toggle circuit. Two types of gate circuits are used, the "AND" gate and the "OR" gate. Both gates are of conventional form, employing rectifying diodes in the input and output leads, an example of such gates being shown in "The Bell System Technical Journal," September 1953, pages 1137–1154, in an article entitled "Semiconductor Diode Gates," by L. W. Hussey. The "AND" gate requires a signal input on all input leads to produce an output signal at the output lead, whereas the "OR" gate will provide a signal at the output lead if a signal is applied to any one, or more than one, input lead. The symbol for a gate circuit is shown in FIG. 1 with the reference GA. This is identified as an "AND" gate by the figure "2" within the circle, indicating that two signal inputs are required to open the gate. The figure in the circle always indicates the number of inputs required to open the gate. An "OR" gate, in contrast, invariably has a figure "1" within the circle, indicating that only one input signal is required to open it. In accordance with the usual convention in this symbol, arrowheads are shown on the input leads pointing into the circle.

The toggle circuits employed are also of conventional type, being a development of the well-known Eccles-Jordan trigger circuit, and comprising a symmetrical bistable arrangement of two amplifiers with their inputs and outputs interconnected. The arrangement is such that an external input to one amplifier of the pair produces an output from that amplifier, which persists until an external input is received by the other amplifier, when the device changes to its other stable condition and an output is produced by the second amplifier. The modification involves the use of strobe pulses to effect the reversal of the device. In this arrangement, a signal input to one side of the toggle circuit is not sufficient on its own to switch the device if it is in the alternative condition, but the circuit is switched upon the occurrence of the next strobe pulse, provided that the signal input has persisted for a brief minimum period. This means that the transition always takes place at an accurately defined instant, irrespective of the shape of the input signal. An example of a toggle circuit of this type is shown in British Patent No. 801,681.

A toggle circuit is shown symbolically in FIG. 1, bearing the reference MA. The two sides of the circuit are marked "1" and "0" respectively, the input leads to the 1 and 0 sides being marked with arrowheads pointing into the toggle circuit, and the output leads extend from the right-hand side. Signals on these output leads are usually identified by the same reference as the toggle circuit, in the same way as signals from a read circuit, and in this example a signal appearing on the output lead from the 1 side of the toggle circuit is designated MA, while a signal produced at the output lead from the 0 side is designated $\overline{MA}$. In the drawing, connections are shown to the two sides of the toggle circuit from the strobe pulse output lead, indicating that these are required in addition to the signal input leads to operate the circuit, but it is conventional in this symbol to omit the strobe input connections, and in the remaining circuits illustrating the invention, toggle circuits are shown without these strobe connections.

An example of the operation of a toggle circuit such as MA can be described with the help of this drawing. Suppose that a 0 is read from the drum by the read circuit RCA, then an input is applied to the 0 side of the toggle circuit MA, and this signal, together with the following strobe pulse, switches the toggle circuit to the 0 condition and an output signal $\overline{MA}$ is produced. In the 0 condition, the toggle circuit is regarded as being "reset." It will be seen from the drawing that in the example shown, two conditions are now required to reverse the condition of the toggle circuit: a 1 signal must be read from the drum by the read circuit RCA, and at the same time a signal must appear on lead TA28, so that the gate GA is operated and a signal is applied to the 1 side of the toggle circuit. If, then, a signal RCA occurs during the timing pulse TA28, an output is produced by gate GA, and on the occurrence of the next strobe pulse the toggle circuit is switched to the 1 condition and produces an output MA. When the toggle circuit is changed to the 1 condition, it is said to be "set."

It was previously stated that signals such as RCA and $\overline{RCA}$ are controlled by the strobe pulse source, and in fact the leading edge of such signals are coincident with strobe pulses. It should also be mentioned that the strobe pulses are timed to occur towards the end of the time intervals defined by the TA pulses. Assuming that the conditions are fulfilled for setting the toggle circuit MA, the sequence of events in setting the toggle circuit is as follows.

A strobe pulse occurs towards the end of the timing period TA27, and this strobe pulse coincides with the leading edge of the signal RCA;

At the beginning of the timing pulse TA28, both inputs to the gate circuit GA are energized, and an output signal from the gate is applied to the 1 side of the toggle circuit MA; this input signal is insufficient in itself to set the toggle circuit, but towards the end of the timing pulse TA28 a further strobe pulse occurs, coincident with the trailing edge of the signal RCA, and this strobe pulse triggers the toggle circuit to the set condition;

At the same time the gate GA is closed by the termination of signal RCA;

Shortly afterwards, at the end of the timing pulse TA28, the other input to gate GA is removed.

It will thus be seen that although an output MA is produced by the toggle circuit at the end of the timing pulse TA28, it is too late to be effective during that timing pulse, and can only be used when the next strobe pulse occurs during the timing period TA29. Assuming that the 1 signal read by the circuit RCA during timing pulse TA28 is followed by a 0 signal, the corresponding signal $\overline{RCA}$ will commence at the same instant as the strobe pulse which caused the toggle circuit MA to be set. The latter will therefore not be reset until the occurrence of the following strobe pulse, which is coincident with the termination of the signal $\overline{RCA}$.

The circuits for setting and resetting toggle circuit MA may be briefly described in the form of "circuit script," which is an adaptation of Boolean algebra. In this form, the circuits shown in FIG. 1 for controlling the toggle circuit are respectively:

$$RCA.TA28-MA$$

and $$\overline{RCA}-\overline{MA}$$

The significance of this form of expressing circuit operations is fully described in the Post Office Electrical Engineers Journal, Vol. 51, part 2, July 1958, pages 137–144, in an article entitled "Design Features of the Lee Green Magnetic Drum Register Translator," by K. G. Marwing.

It will be appreciated that all the circuits represented by the block diagram FIG. 1 are well known, and are merely described here to assist in the understanding of the invention.

*Layout of tracks in magnetic drum store*

For the purpose of storing information relating to a line or junction on the drum, the lines and junctions are divided into conveniently sized groups, the stored information relating to each group being distributed over several drum tracks. Certain of the magnetic drum control equipment is common to one group of lines and junctions, and is referred to as "group equipment." Each group is divided into a number of sub-groups, each of which may include, for example, 100 lines and junctions. In the embodiment being described, the tracks required to store the information relating to a group comprising eight such sub-groups are shown in FIGS. 2 and 3.

It will be seen from the drawing that each sub-group requires either two or three complete tracks, and the area occupied on each of these tracks by each line or junction in the sub-group will be regarded as of one word length. Each sub-group requires a main library track and a meter track, and two of the sub-groups require, in addition, an auxiliary library track. Two further tracks are provided within the group, referred to as "operate" tracks, and these are shared by the eight sub-groups. One word length on each of these operate tracks is sub-divided into four quarter-words, providing eight quarter-words in each word length. The eight lines or junctions belonging to one group and occupying the same word length on the tracks are each allotted one of these eight quarter-words, and FIG. 2 shows to which sub-groups these quarter-words are allotted.

While corresponding words on the different sub-group tracks belonging to the same group are arranged to pass under their respective read and write heads simultaneously, the quarter-words on the operate tracks containing information corresponding to these words are displaced relative to the line appearances to which they relate. They are, in fact arranged to pass under their respective read and write heads one word length in advance of the corresponding information on the library and meter tracks. It will be noticed from FIG. 2 that the eight sub-groups comprising one group are numbered 3–10. This is done to avoid the misleading association of the operate tracks with similarly numbered sub-groups. All multiple appearance lines such as P.B.X. groups and outgoing junctions are allotted to the sub-groups numbered 4 and 7, and as these require more information than ordinary lines, the additional library track referred to as the auxiliary library track is provided for each of these two sub-groups.

The arrangement of information on the library and operate tracks can be seen from FIG. 4. In this drawing, a length of track corresponding to one word is shown for each of these three types of track, the meter track being omitted because it is not concerned in the present invention. Considerably more information than is shown in the drawing is stored on these tracks in practice, only the details helpful to the description of the present invention being shown here.

On the auxiliary library track in sub-groups 4 and 7, a number known as the "group number", relating to P.B.X. lines and outgoing junctions, occupies the storage bits TA1–16, corresponding to the position occupied by the directory number of a line on the main library track. Each line in a P.B.X. group or junction in a junction group is given the same group number. In addition to the group number, each line or junction in such a group has an individual sequence number, which identifies its position in that group in order of priority. The six bits TA19–24 are provided for storing the sequence number, which is stored in binary form. There are thus 64 possible values for this number and the arrangement provides for multiple appearance groups of up to 64 lines or junctions. If larger multiple appearance groups are required, a second group number may be allotted. The direction of scanning of a track as seen in the drawing is from left to right, and it will be seen that the bits of the sequence number are arranged in order of descending significance i.e. the highest order bit, $2^5$, in TA19, is scanned first.

The only information on the main library track which concerns a multiple appearance line is that stored in bit TA18, where a 1 is permanently stored in the words relating to multiple appearance lines only. The operate track contains transient and semi-permanent information relating to lines and junctions, such as "free" or "busy", "line fault" and so on. This information is grouped on the operate tracks to avoid the necessity for providing circuits for constantly changing such information on the library tracks. The only information stored on the operate tracks which is relevant to this invention is that stored in the first bit of the appropriate quarter words, which will be referred to as the "busy" indication. A 1 is marked in the "busy" bit when a line or junction is in use.

*General description*

Figure 5:
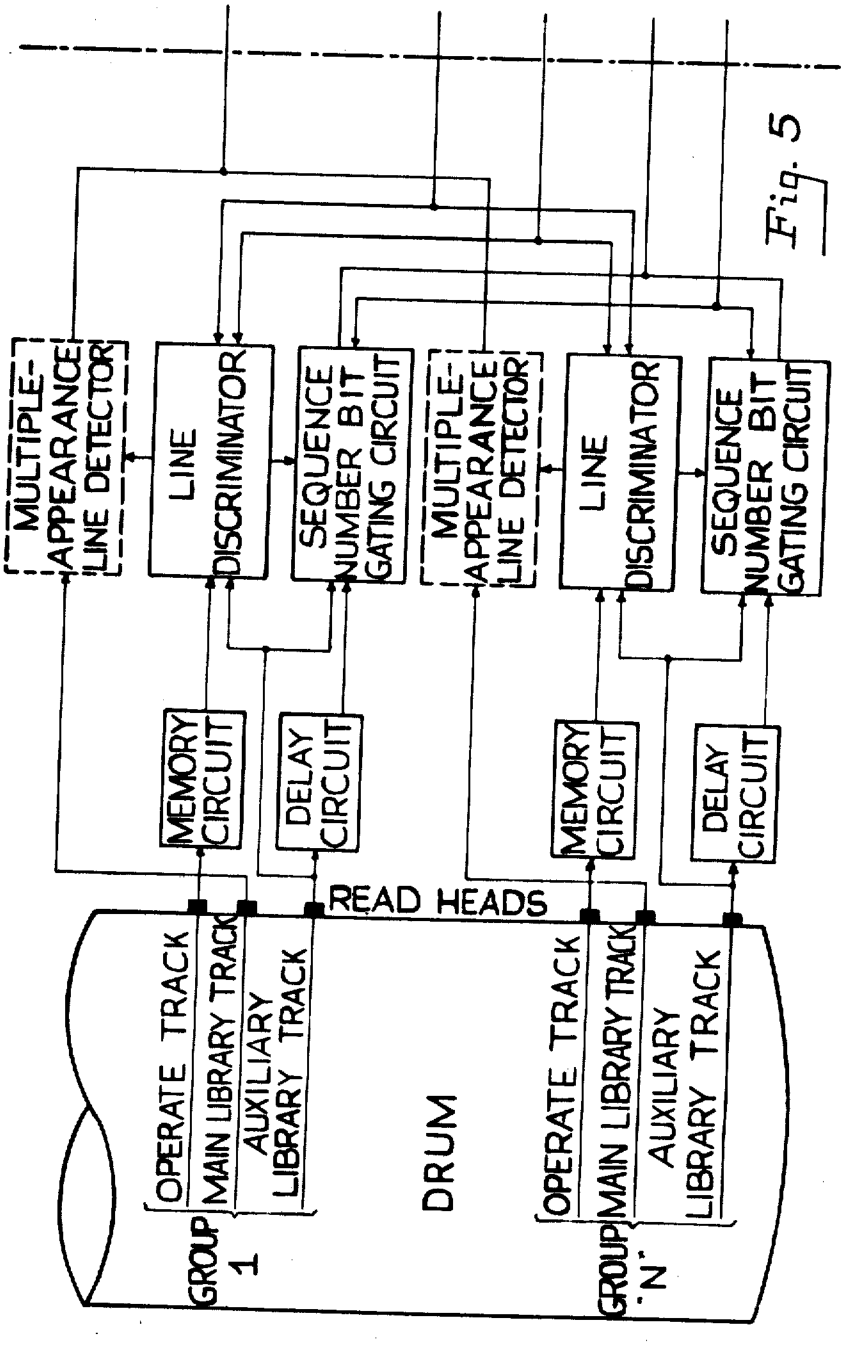
Figure 6:
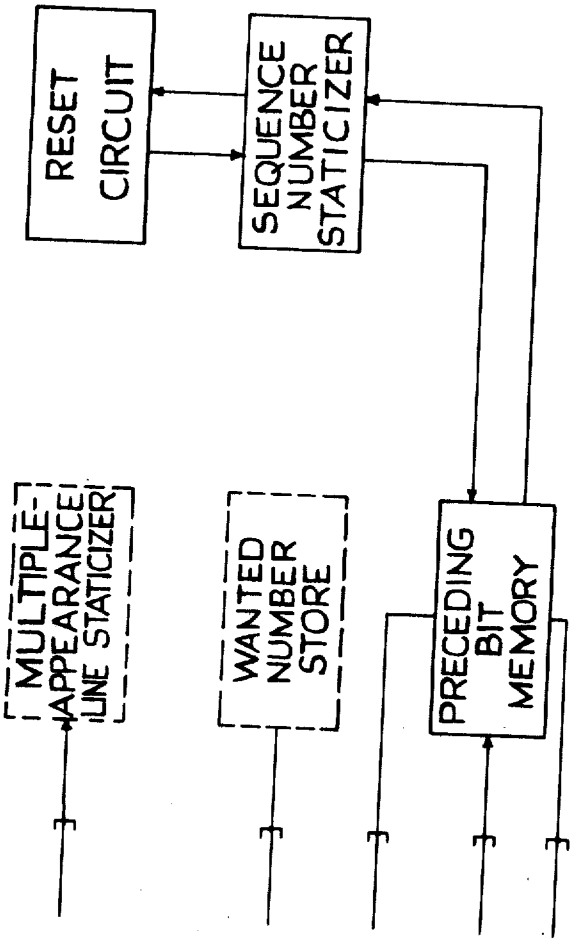

A brief description will now be given, with reference to FIGS. 5 and 6, of the operation of the system in determining the free line of highest priority in setting up a connection to a multiple appearance group. The search for the required line or junction takes place over the two relevant sub-groups, 4 and 7, in every group simultaneously. For explanatory purposes, however, only the operate, main library and auxiliary library tracks of one sub-group in each of two groups, are shown on the drum in the drawing, the two groups shown being numbered "1" and "N". As a further simplification, the read circuits associated with the read heads on these tracks are omitted from the drawings. In the drawing, the equipment shown to the right of the broken vertical line is common equipment, while the remaining equipment, shown between the drum and the broken line, is equipment which is individual to each sub-group.

The function of the circuit is to make a complete scan of all the tracks associated with multiple appearance lines, to examine the sequence number of all such lines having the appropriate group number if these lines are free, to compare sequence numbers as they are read with other sequence numbers read at the same time and also with the highest value sequence number read earlier in the scan, and to store in the equipment designated SEQUENCE NUMBER STATICIZER the highest value sequence number which has been read up to that time. At the end of one complete revolution of the drum, the sequence number of the free line in the wanted group having the highest priority will be stored in the SEQUENCE NUMBER STATICIZER, and during subsequent revolutions of the drum, the line or junction having this sequence number can be taken into use.

As the scan takes place, information relating to any line or junction with the wanted group number is first encountered on the appropriate operate track. The only relevant information on this track is whether a line is free or busy, and if a line is free, this information is stored in the MEMORY CIRCUIT associated with that track. The "line free" indication is retained in this circuit during the remainder of the scan of the word in which it appeared, and also during the following word, when further information relating to the same line is read from the appropriate library track. The next relevant item of information to appear at a read head is the group number of the multiple appearance group. This is read from the auxiliary library track and fed into the appropriate LINE DISCRIMINATOR. The LINE DIS- CRIMINATOR compares the group number read from the auxiliary library track with a group number which is displayed to all LINE DISCRIMINATORS by the common WANTED NUMBER STORE, into which the wanted group number was inserted before the search for the wanted line commenced. A LINE DISCRIMINATOR is thereby able to determine when a line appearance with the required group number has been reached, and also, by reference to the appropriate MEMORY CIRCUIT, whether this line is free or busy.

The next item to be read from the drum is the marking identifying a multiple appearance line on a main library track. These markings are detected by MULTIPLE APPEARANCE LINE DETECTORS, which also receive a signal from the associated LINE DISCRIMINATORS when a free line in the wanted multiple appearance group is encountered. When both conditions arise, the affected MULTIPLE APPEARANCE LINE DETECTOR applies a signal to the common MULTIPLE APPEARANCE LINE STATICIZER. The MULTIPLE APPEARANCE LINE STATICIZER retains this marking throughout the search for the best choice free line, and uses it during subsequent revolutions of the drum when the chosen line is taken into use.

When a LINE DISCRIMINATOR detects a free line in the wanted multiple appearance group, it applies a gating signal to its associated SEQUENCE NUMBER BIT GATING CIRCUIT. All sequence numbers are read from the auxiliary library tracks by the SEQUENCE NUMBER BIT GATING CIRCUITS, but only in the presence of a gating signal from the associated LINE DISCRIMINATOR will a SEQUENCE NUMBER BIT GATING CIRCUIT allow a sequence number to be passed on to the common SEQUENCE NUMBER STATICIZER.

There is a further criterion for deciding whether a sequence number shall be passed by a SEQUENCE NUMBER BIT GATING CIRCUIT. It will be recalled that the purpose of the equipment is to write into the SEQUENCE NUMBER STATICIZER only the highest priority sequence number which has been encountered at any instant. Moreover, eligible sequence numbers may be read in several sub-groups simultaneously. Any sequence number being read, therefore, must be compared both with the sequence number, if any, already written in the SEQUENCE NUMBER STATICIZER, and also with the one or more further sequence numbers which may be read from the drum at the same time. The arrangement of the six bits representing the sequence number, described in connection with FIG. 4, simplifies the comparison, since the highest order bit is encountered first. It is therefore only necessary to examine the concurrently read bits, until a disagreement first occurs between them, and when this is detected, the number containing a 1 where a second number contains a 0 must necessarily be a higher number and relate to a higher priority line. For example, if the sequence number 011101 is read from the auxiliary library track of one sub-group at the same time as a second sequence number 011110 is being read from a second sub-group, disagreement will be found when the fifth bit is scanned, and the comparison will detect that the second sequence number has the higher value. This second number would then be gated through the SEQUENCE NUMBER BIT GATING CIRCUIT associated with the sub-group in which it appeared, while the first sequence number would be rejected after the fourth bit by its own SEQUENCE NUMBER BIT GATING CIRCUIT.

The same conditions apply in comparing the sequence numbers read from the track with a sequence number already stored in the SEQUENCE NUMBER STATICIZER. If the number read from the drum is of higher value than that in the staticizer, the new number is allowed to proceed to the staticizer, where the old number is replaced from the point at which disagreement occurs, while if the new number is found to be of lower value than that already stored, the appropriate SEQUENCE NUMBER BIT GATING CIRCUIT inhibits the transmission of the new number from the point at which disagreement occurs. This arrangement of allowing numbers to proceed until a disagreement occurs does not give rise to false registration in the staticizer in the event of the new number being lower than that already stored, because only those bits are allowed to proceed to the SEQUENCE NUMBER STATICIZER which are in agreement with the bits already stored.

The method of determining whether a sequence number is passed by a SEQUENCE NUMBER BIT GATING CIRCUIT is as follows. The SEQUENCE NUMBER STATICIZER requires that only 1's need to be passed to it from the drum, 0's being ignored. The first decision, then, that has to be made by a SEQUENCE NUMBER BIT GATING CIRCUIT is whether a 1 or a 0 is being read. If a 1 is read as part of a sequence number, the second decision has to be made, which is whether or not this 1 should be allowed to proceed to the SEQUENCE NUMBER STATICIZER. To make this decision, the SEQUENCE NUMBER BIT GATING CIRCUIT examines the bit read from the drum immediately preceding the present bit. If this preceding bit was also a 1, the present 1 is allowed to proceed because it is obvious that, at least down to the present bit, no other sequence number concurrently read from the drum can have a higher value. If, however, the immediately preceding bit was a 0, there is a possibility that a second number being read at the same time could have a higher value, as would be the case if the second number had a 1 in the preceding bit position. If this proves to be the case, the sequence number under consideration must not be allowed to proceed any further since a higher priority sequence number is available. On the other hand, if no other sequence number being read at the same time had a 1 in the preceding bit position, the SEQUENCE NUMBER BIT GATING CIRCUIT must be allowed to pass forward the present 1, because at least up to that point no indication is available that any other sequence numbers which may be read at the same time have higher values. It was previously mentioned that there is no disadvantage in transmitting several sequence numbers through their respective SEQUENCE NUMBER BIT GATING CIRCUITS simultaneously as long as they are in agreement because this will give rise to no confusion.

Referring to the drawing, it will be seen that a DELAY CIRCUIT is provided in one of the paths between an auxiliary library track and its SEQUENCE NUMBER BIT GATING CIRCUIT. This DELAY CIRCUIT has a delay of one bit time, and enables the following SEQUENCE NUMBER BIT GATING CIRCUIT to observe the currently read bit over the direct path, and at the same time to observe the previously read bit at the output of the DELAY CIRCUIT. The indication as to whether the previous bit read from any of the other auxiliary library tracks was a 1 is obtained from the PRECEDING BIT MEMORY. It was mentioned that only 1's are passed forward by the SEQUENCE NUMBER BIT GATING CIRCUITS, so that the PRECEDING BIT MEMORY has only to remember whether a 1 was previously received from any sub-group. This information is passed back to all the SEQUENCE NUMBER BIT GATING CIRCUITS, and if one or more sub-groups has read a 0 in the previous bit position when the PRECEDING BIT MEMORY indicates that at least in one other case a 1 appeared, the remaining bits of the lower value sequence number or numbers are blocked by their respective SEQUENCE NUMBER BIT GATING CIRCUITS.

Similar arrangements are made for deciding whether a sequence number should be allowed to proceed to the SEQUENCE NUMBER STATICIZER in view of the number already contained in the staticizer. The PRE- CEDING BIT MEMORY examines the bits stored in the SEQUENCE NUMBER STATICIZER in turn at the same time as the corresponding bit positions on the auxiliary library tracks are scanned, and remembers a 1 in the preceding bit position in the same way as it does in the case of signals read from the drum. If the preceding bit stored in the SEQUENCE NUMBER STATICIZER was a 1, this information is passed back by the PRECEDING BIT MEMORY to all SEQUENCE NUMBER BIT GATING CIRCUITS so that all sequence numbers whose preceding bit was a 0 will be blocked. If, however, a higher value sequence number is read from the drum than that already stored in the SEQUENCE NUMBER STATICIZER, at one point a 0 written in the staticizer would be changed to a 1, and this change is observed by the RESET CIRCUIT, which thereupon changes all subsequent bits stored in the SEQUENCE NUMBER STATICIZER to 0, so that the new number can be written in without danger of the old and new number being confused.

*Detailed circuit description*

Figure 7:
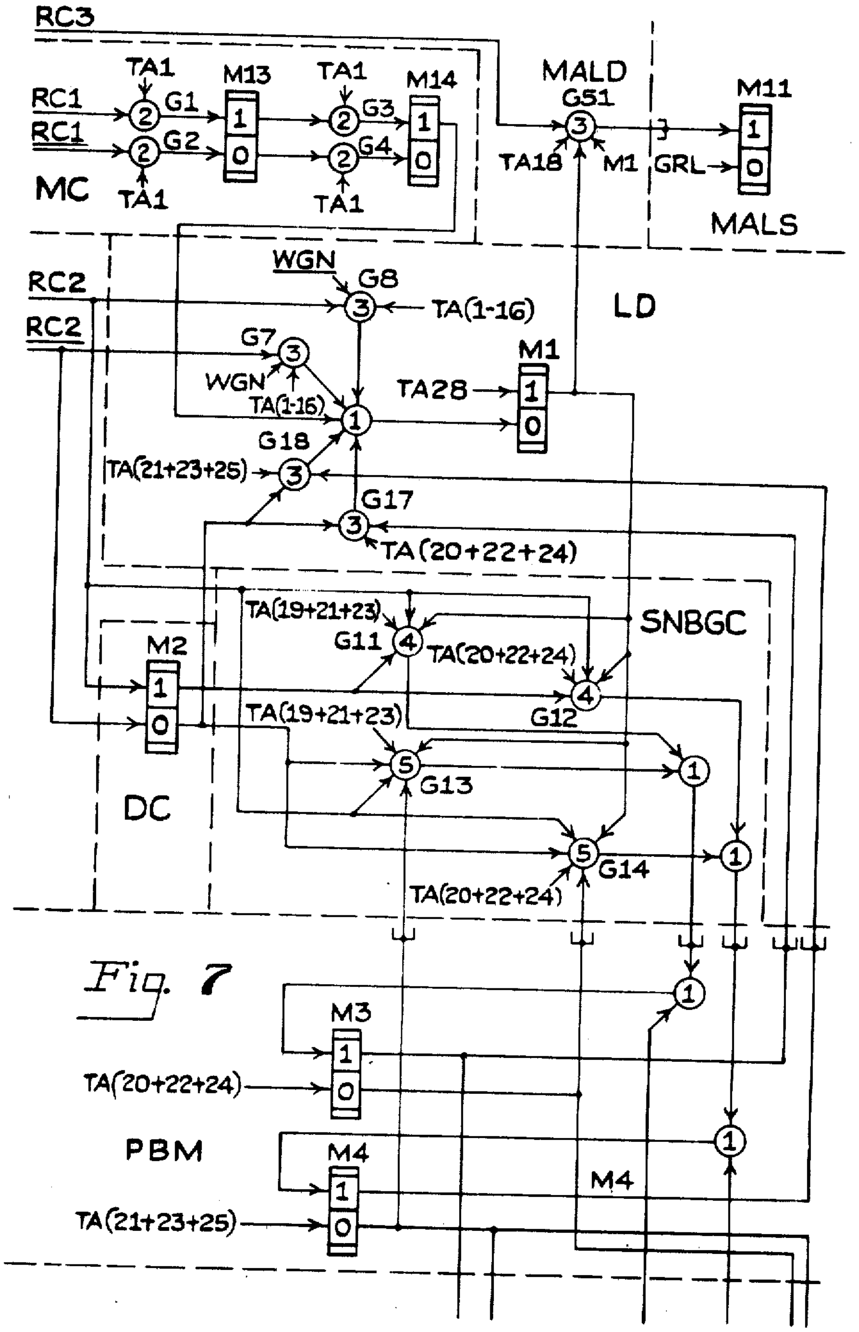
Figure 8:
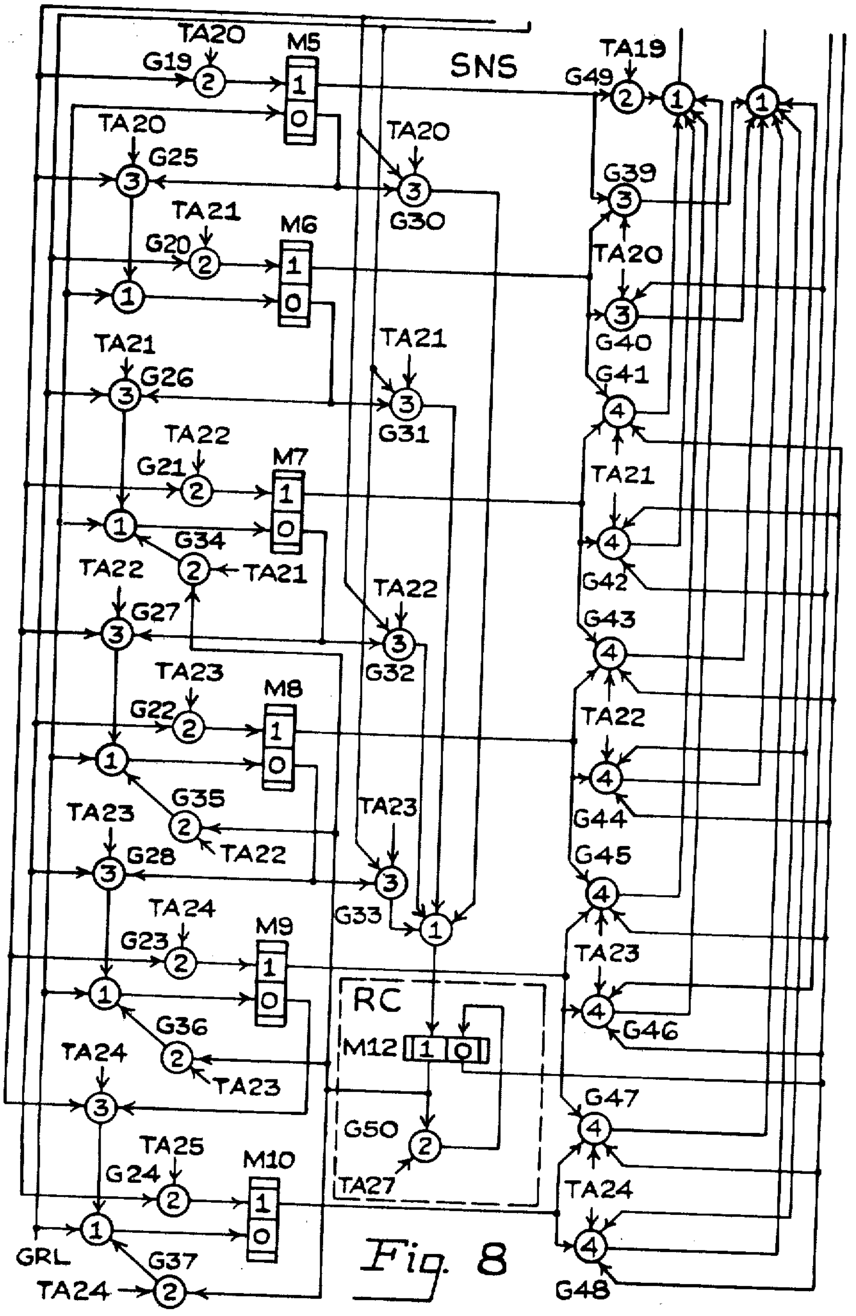

A description of the circuit operation will now be given with reference to the drawings of FIGS. 7 and 8, as far as possible in the order in which the circuits are used. In order to assist identification of the different parts of the circuit with the blocks shown in FIGS. 5 and 6, the corresponding parts of the circuit are enclosed in chain dotted lines and designated as follows:

| | |
|---|---|
| MEMORY CIRCUIT | MC |
| LINE DISCRIMINATOR | LD |
| DELAY CIRCUIT | DC |
| SEQUENCE NUMBER BIT GATING CIRCUIT | SNBGC |
| PRECEDING BIT MEMORY | PBM |
| SEQUENCE NUMBER STATICIZER | SNS |
| RESET CIRCUIT | RC |
| MULTIPLE APPEARANCE LINE DETECTOR | MALD |
| MULTIPLE APPEARANCE LINE STATICIZER | MALS |

*Operate track memory circuit*

Each sub group has its own MEMORY CIRCUIT associated with the relevant operate track This circuit remembers a "busy" marking during the word in which it occurs and during the following word to cater for the time difference in reading corresponding information from the operate and library tracks. It will be recalled that multiple appearance lines appear in sub-groups 4 and 7, and the "busy" indication for lines in these two subgroups will occur in bits TA8 and TA1 respectively, on the appropriate operate tracks. The relevant part of a MEMORY CIRCUIT for lines in sub-groups 7 is shown in FIG. 7 by way of example.

In this drawing, the input leads from the operate track read circuit are designated RC1 and $\overline{RC1}$ respectively, and carry 1 and 0 signals read from the operate track. Two toggle circuits are provided, M13 and M14. In the subgroup under consideration, where the "busy" indication occurs in the bit position TA1, AND gates G1 and G2, which feed the 1 and 0 signals from the drum into the toggle circuit M13, are therefore both provided with inputs from the timing pulse TA1, so that only signals read from the operate track during this timing pulse are registered by the toggle circuit M13. The circuits controlling this toggle circuit can be written:

$$RC1.TA1—M13 \quad (1)$$

and $$\overline{RC1}.TA1—\overline{M13} \quad (2)$$

This toggle circuit remains in the condition to which it has been switched until the following TA1 pulse, which will occur at the beginning of the word in which the relevant information appears on the library tracks. The second toggle circuit, M14, is provided to store the previously read information throughout this second word, and is therefore switched to the same condition as toggle circuit M13 by the gate circuits G3 and G4 at the beginning of this word, on the occurrence of the TA1 timing pulse. The circuits for copying the setting of toggle circuit M13 into toggle circuit M14 are:

$$M13.TA1—M14 \quad (3)$$

and $$\overline{M13}.TA1—\overline{M14} \quad (4)$$

At the time this change takes place, the first toggle circuit M13 is again switched to correspond to the track signal by circuits (1) and (2). Similar circuits, controlled by the timing pulse TA8, are provided in the case of subgroup 4.

*Line discriminator*

A LINE DISCRIMINATOR is provided for each subgroup, and comprises one toggle circuit, M1. This is set, i.e. switched to the 1 condition, by each timing pulse TA28, in the circuit:

$$TA28—M1 \quad (5)$$

and is thus in the set condition at the beginning of the scan of each word. This toggle circuit, when in the set condition, allows sequence numbers read from the auxiliary library track to be transmitted through the associated SEQUENCE NUMBER BIT GATING CIRCUIT, and in the reset condition inhibits such transmission.

The toggle circuit can be reset by any one of a number of conditions, the first in order of time being the occurrence of a "busy" marking relating to the line or junction being scanned. The "busy" condition is indicated by toggle circuit M14 being set, and in this event toggle circuit M1 is immediately reset by the circuit:

$$M14—\overline{M1} \quad (6)$$

The toggle circuit M1 must also be reset during the scan of each unwanted line, and circuits are therefore provided for reading the information stored in the group number store on the auxiliary library track, and comparing it with the group number of the wanted group of lines or junctions. The wanted group number is obtained from a circuit shown in FIG. 4 as WANTED GROUP NUMBER STORE, but this is not shown in detail because it is not relevant to the present invention. It may be mentioned, however, that it contains 16 toggle circuits, corresponding to the 16 information storage positions occupied by the group number on an auxiliary library track, and that these toggle circuits are scanned, by means of timing pulses, in synchronism with the scan of the group number on the drum. The result of the scan in the WANTED NUMBER STORE appears on two alternative leads, WGN for 1 signals and $\overline{WGN}$ for 0 signals, and these are distributed to all the LINE DISCRIMINATORS.

Two circuits are provided, involving gates G7 and G8, for comparing the wanted group number bit by bit with the group number read from an auxiliary library track:

$$\overline{RC2}.WGN.TA(1\text{–}16)—\overline{M1} \quad (7)$$

and $$RC2.\overline{WGN}.TA(1\text{–}16)—\overline{M1} \quad (8)$$

The first of these circuits resets toggle circuit M1 if a 0 signal is read from the auxiliary library track at the same time as a 1 is read in the WANTED NUMBER STORE in any of the storage elements TA1–16, and the second resets toggle circuit M1 in the event of a 1 signal being read from the auxiliary library track at the same time as a 0 signal is read in the WANTED NUMBER STORE during the same scanning period. Thus, if after a timing pulse TA16 the toggle circuit M1 is still in the set condition, it is concluded that a free line in the wanted group is being scanned.

The remaining conditions under which a toggle circuit M1 is reset will be described during the description of the comparison of sequence numbers read simultaneously from different sub-groups.

*Delay circuit*

It was mentioned previously that there are two routes for information to be passed from an auxiliary library track to a SEQUENCE NUMBER GATING CIRCUIT, one direct and one through a DELAY CIRCUIT. This DELAY CIRCUIT comprises one toggle circuit M2, which is set by a 1 signal and reset by 0 signals read from the auxiliary library track, by means of the two circuits:

$$RC2\text{—}M2 \qquad (9)$$

and $$\underline{RC2}\text{—}\underline{M2} \qquad (10)$$

RC2 being the designation for the read circuit of an auxiliary library track. Because of the use of a strobe pulse source to control the instants of switching of toggle circuits, there will be a delay corresponding to the interval between two strobe pulses between the switching of toggle circuit M2 and the instant at which an output on the side to which it has been switched becomes available for controlling further circuits. This toggle circuit may therefore be regarded as providing a delay of one TA timing pulse for the information read from an auxiliary library track.

*Sequence number bit gating circuit and preceding bit memory*

It will be recalled that a 1 is always passed forward by a SEQUENCE NUMBER BIT GATING CIRCUIT if the previous bit read in a sequence number in the relevant sub-group has also been a 1. The AND gate G11 in a SEQUENCE NUMBER BIT GATING CIRCUIT is used in a circuit for setting toggle circuit M3 in the PRECEDING BIT MEMORY in this event. The circuit is:

$$RC2.M1.M2.TA(19+21+23)\text{—}M3 \qquad (11)$$

This circuit includes 1 signals direct from the appropriate auxiliary library track by the read circuit RC2 and 1 signals, from the same track and delayed by one timing pulse, from the set side of toggle circuit M2. There is also an input from the set side of toggle circuit M1 in the LINE DISCRIMINATOR, the latter input ensuring that only information relating to a free wanted line is passed by this gate. The timing pulses TA19, TA21 and TA23 restrict the operation of this gate to alternate bits in the sequence number, the remaining bits being dealt with by a corresponding gate G12. This latter circuit is:

$$RC2.M1.M2.TA(20+22+24)\text{—}M4 \qquad (12)$$

and it will be seen that this gate has similar inputs to gate G11 except for the timing pulses. Its output controls the second toggle circuit M4 in the PRECEDING BIT MEMORY. It may be mentioned here that the need for two signal paths from each SEQUENCE NUMBER BIT GATING CIRCUIT to the PRECEDING BIT MEMORY arises from the use of two toggle circuits in the latter for handling the signals passed to it. These two circuits are necessary because they have to be individually reset in the timing pulse following the receipt of a 1 signal, and one toggle circuit is therefore only able to deal with alternate timing periods. The two gates G11 and G12 together cater for all the timing pulses during which the sequence number of a line or junction group can be read, but it will be noticed that a 1 signal appearing in the bit TA19 can never be passed by either of these gates because it can never be preceded by a 1, since bit TA18 on the auxiliary library track always carries 0 signals. A 1 appearing in bit TA19 is therefore dealt with by the circuit about to be described.

It will be recalled that, in the event of a 1 signal following a 0 signal in a sequence number, the 1 signal is transmitted through the appropriate SEQUENCE NUMBER BIT GATING CIRCUIT if no other auxiliary library tracks produced a 1 signal in the preceding bit position of a free line in the wanted group. Two circuits involving gates G13 and G14 are provided for provided for determining whether a 1 signal should be passed to the common equipment under these conditions. These are:

$$RC2.M1.\underline{M2}.\underline{M4}.TA(19+21+23)\text{—}M3 \qquad (13)$$

and $$RC2.M1.\underline{M2}.\underline{M3}.TA(20+22+24)\text{—}M4 \qquad (14)$$

In the first of these circuits, a 1 signal from the read circuit RC2 on an auxiliary library track together with a simultaneously occurring 0 signal from the delay toggle circuit M2, are applied to toggle circuit M3 in the PRECEDING BIT MEMORY during clock pulses TA19, TA21 or TA-23 provided that, first, the LINE DISCRIMINATOR toggle circuit M1 indicates that a free line in the wanted group is being scanned, and second, that a 0 signal was read in the preceding bit position in every other relevant sub-group. This latter condition is distinguished by the reset condition of the toggle circuit M4 in the PRECEDING BIT MEMORY. A resetting circuit:

$$TA(21+23+25)\text{—}\underline{M4} \qquad (15)$$

is provided, which resets this toggle circuit after each possible timing pulse in which a 1 can be applied to it from any SEQUENCE NUMBER BIT GATING CIRCUIT. The reset output of the toggle circuit M4, therefore, only gives a 0 output during timing periods TA21, TA23 or TA25 if no 1 signal has been applied to it in the preceding bit by any SEQUENCE NUMBER BIT GATING CIRCUIT. The gate circuit G13, being operable only during odd numbered timing pulses, must refer to toggle circuit M4 rather than M3 to ascertain what signal was fed to the PRECEDING BIT MEMORY during the previous timing period, since toggle circuit M4 only receives signals during the even numbered timing pulses.

The gate circuit G14 is controlled in a similar way from the reset output of toggle circuit M3 in the PRECEDING BIT MEMORY, the latter toggle being reset by the timing pulses TA20, TA22 and TA24 in the circuit:

$$TA(20+22+24)\text{—}\underline{M3} \qquad (16)$$

Thus, if a 1 is read from an auxiliary library track in the sequence number of a free line in the wanted group, following a 0 read from the same track, the 1 would only be passed through gate G13 or its corresponding gate G14 if no other sub-group had produced a 1 signal for its preceding bit. This circuit caters for a 1 stored in the first bit position of a sequence number, which must always be allowed to pass by the SEQUENCE NUMBER BIT GATING CIRCUIT, since the sequence number with a 1 in its highest order bit must always have a higher value than one with a 0 in this position. The signal RC2 applied to gate G13 during the timing period TA19 will always be allowed through the gate provided that it relates to a free line in the wanted group, because the toggle circuit M4 in the PRECEDING BIT MEMORY will still be in the reset condition folowing the previous resetting pulse at TA25 in the previous word.

*Rejection of lower value sequence numbers by resetting the line discriminator*

From the foregoing it will be seen that when a 1 is read from an auxiliary library track in a sequence number relating to a free line in the wanted group, it sets one or other of the two toggle circuits M3 and M4 in the PRECEDING BIT MEMORY provided that (a) it follows a 1 in the preceding bit of the same sequence number, or (b) it appears in the first bit of a sequence number, or (c) if it is preceded by a 0, no other sub-group has produced a 1 in the preceding bit position. The signals stored temporarily in the PRECEDING BIT MEMORY are to be compared with signals already stored in the SEQUENCE NUMBER STATICIZER, and if they represent a higher number than that already stored, the number in the staticizer is replaced. Precautions must therefore be taken to prevent the 1 signals in different bit positions of two or more sequence numbers from being combined into a false sequence number. For example, if the two sequence numbers 110110 and 111101 appeared in two different sub-groups simultaneously, the first two 1's in the first number and the last 1 would be gated into the PRECEDING BIT MEMORY by the circuits as so far described, and so will the first four 1's of the second number, resulting in a false number 111110 being presented to the SEQUENCE NUMBER STATICIZER. It is therefore necessary to provide a circuit for discontinuing the transmission of a sequence number through a SEQUENCE NUMBER BIT GATING CIRCUIT once it has been established that a second concurrently read number has a higher value.

The condition for rejecting a sequence number in favour of a higher value number being read at the same time is that a 0 appears in the smaller value number in the position occupied by a 1 in the other number. Circuits are therefore provided in each LINE DISCRIMINATOR which compare each 0 signal in an eligible sequence number read from that sub-group with signals read in corresponding positions in the other sub-groups, to determine whether a 1 signal was read in any of them. The two circuits provided are:

$$\underline{M2}.M3.TA(20+22+24)—\underline{M1} \qquad (17)$$

and $$\underline{M2}.M4.TA(21+23+25)—\underline{M1} \qquad (18)$$

The first of these circuits, comprising gate G17, resets the toggle circuit M1 in the event of a 0 being read in any of the sequence bits TA19, TA21 and TA23, indicated by the reset condition of toggle circuit M2 during any of the timing pulses TA20, TA22 and TA24, provided that the toggle circuit M3 is in the set condition, indicating that a 1 has been read in some other sub-group in the previous bit position. The second of the two circuits, comprising gate G18, effects the same comparsion for the remaining storage bits of the sequence number, TA20, TA22 and TA24. It will be seen from the foregoing paragraph that the toggle circuit M1 in a LINE DISCRIMINATOR is not reset until the occurrence of the strobe pulse in the bit position following the one in which the first discrepancy between the larger and smaller sequence numbers occurred. The resetting of this toggle circuit therefore does not take place in time to prevent the first unwanted bit from being transmitted by the corresponding SEQUENCE NUMBER BIT GATING CIRCUIT. This, however, is immaterial, since if the smaller number contains a 1 in this position, it will be rejected by the appropriate one of the two gates G13 and G14 because it was preceded by a 0. All subsequent bits of the smaller sequence number will be rejected by the resetting of the toggle circuit M1 in the LINE DISCRIMINATOR, which is effective in closing gates G11–14 in the SEQUENCE NUMBER BIT GATING CIRCUIT of that sub-group,

*Sequence number staticizer*

In addition to comparing sequence numbers with other sequence numbers read in other sub-groups at the same time, the comparison must also take into account the sequence number already stored in the SEQUENCE NUMBER STATICIZER. This circuit comprises six toggle circuits, M5–10, corresponding to the six bits constituting the sequence number. The number stored in the staticizer is read out one bit at a time by means of the appropriate timing pulses TA19–24, the individual bits being fed into the appropriate toggle circuits M3 and M4 in exactly the same way as sequence numbers read from the drum, except that in this case it is not necessary to pass the number through an equivalent of a sequence number bit gating circuit. There is, however, a complication in the arrangements for reading out a stored number from the staticizer and applying it to the PRECEDING BIT MEMORY. Some of the toggle circuits of the staticizer must be reset when a sequence number of higher value is read from the drum, and it is necessary to avoid the possibility of wrong information being passed back to the PRECEDING BIT MEMORY by reading out from the staticizer bits which are on the point of being changed. Before describing the extraction of information from the staticizer from the control of new sequence numbers read from the drum, the staticizer itself will be described in detail, so that the conditions in which toggle circuits are reset will be understood.

The fact that one of the toggle crcuits M3 or M4 in the PRECEDING BIT MEMORY is in the set condition during any of their appropriate timing pulses, implies either that a 1 is already written in the staticizer in the corresponding bit position, or that a 1 has been read in at least one new sequence number on one or more auxiliary library tracks, or that both these conditions exist. The 1 signals registered by the two toggle circuits in the PRECEDING BIT MEMORY can therefore be fed into their appropriate toggle circuits in the SEQUENCE NUMBER STATICIZER as soon as they become available. Thus, a 1 read from toggle circuit M5 in the staticizer during the timing pulse TA19, or read from an auxiliary library track during this timing pulse, becomes available at the output of toggle circuit M3 during the timing pulse TA20, and a gate G19 is provided for writing this 1 into toggle circuit M5 during the timing pulse TA20, the circuit being simply:

$$M3.TA20—M5 \qquad (19)$$

Similar circuits are provided for writing in 1's, as they appear on toggle circuits M3 and M4, into the appropriate toggle circuits of the staticizer by means of the ensuing timing pulses TA21–25. These circuits are:

$$M4.TA21—M6 \qquad (20)$$

$$M3.TA22—M7 \qquad (21)$$

$$M4.TA23—M8 \qquad (22)$$

$$M3.TA24—M9 \qquad (23)$$

and $$M4.TA25—M10 \qquad (24)$$

the gates involved in these five circuits being gates G20–24.

When a higher value number is being written into the SEQUENCE NUMBER STATICIZER, it is necessary to reset all the toggle circuits in the staticizer circuits following that in which the first change from a 0 to a 1 takes place, to avoid confusion between the old and new numbers. This is done in two stages. First, a set of circuits is provided for recognising a change from a 0 to a 1 condition taking place in any of the toggle circuits of the staticizer, and for resetting the toggle circuit immediately following the one in which such a change is detected. The second stage uses a further set of circuits for resetting all the toggle circuits in the staticizer subsequent to these two.

Returning to the first stage of this resetting operation, suppose that the first toggle circuit in the staticizer, M5, contained a 0, and that a new sequence number is to be writtten which has a 1 as its first bit. A resetting condition must now be applied to toggle circuit M6 in case this is in the set condition. The circuit for doing this recognizes that toggle circuit M5 is in the reset condition and at the same time that a setting signal is being applied to it. The resetting gate for toggle circuit M6, therefore, requires inputs from the reset side of toggle circuit M5, from the set side of toggle circuit M3, and from the timing pulse source TA20. The gate G25 satisfies these requirements, and the required resetting circuit is:

$$M3.\underline{M5}.TA20—\underline{M6} \quad (25)$$

Similar circuits are provided for resetting toggle circuits M7–10 under the same conditions i.e. the previous toggle circuit is being changed from 0 to 1. These circuits are, $$M4.\underline{M6}.TA21—\underline{M7} \quad (26)$$

$$M3.\underline{M7}.TA22—\underline{M8} \quad (27)$$

$$M4.\underline{M8}.TA23—\underline{M9} \quad (28)$$

and $$M3.\underline{M9}.TA24—\underline{M10} \quad (29)$$

the gate circuits involved being G26–29.

The second stage of the reset employs the RESET CIRCUIT, which contains the toggle circuit M12. This circuit is set by any of the combinations of signals occurring in the gates G25–28, the RESET CIRCUIT thus being set when any of the toggle circuits M5–8 in the staticizer is being changed from the 0 to the 1 condition. The four circuits employed for setting toggle circuit M12 under these conditions are:

$$M3.\underline{M5}.TA20—M12 \quad (30)$$

$$M4.\underline{M6}.TA21—M12 \quad (31)$$

$$M3.\underline{M7}.TA22—M12 \quad (32)$$

and $$M4.\underline{M8}.TA23—M12 \quad (33)$$

the four gates involved being G30–33. When the RESET CIRCUIT is set, the toggle circuits M7–10 in the SEQUENCE NUMBER STATICIZER are reset during their appropriate timing pulses in the four circuits:

$$M12.TA21—\underline{M7} \quad (34)$$

$$M12.TA22—\underline{M8} \quad (35)$$

$$M12.TA23—\underline{M9} \quad (36)$$

and $$M12.TA24—\underline{M10} \quad (37)$$

the four gates involved being G34–37.

It will be noticed that the toggle circuits M5 and M6 are not reset by the set condition of toggle circuit M12. Such a reset is not required because the toggle circuit M12 need only be effective on the staticizer toggle circuits subsequent to the one immediately following that in which a change from the 0 to the 1 condition has taken place, and toggle circuits M5 and M6 can never fall into this category. It will also be noticed that the toggle circuit M5 has no other resetting circuit operable during a search for sequence numbers, such a circuit being unnecessary because, once a sequence number is found having a 1 in the first bit position, no higher value sequence number which may subsequently be encountered will require this condition to be changed. A general reset arrangement is, however, provided for all the toggle circuits in the SEQUENCE NUMBER STATICIZER, operable after the end of the section of the required line or junction during subsequent revolutions of the drum. A "general reset" signal is then provided, by means not shown, on lead GRL, which resets all the toggle circuits M5–10 in the circuits:

$$GRL—\underline{M5},\ \underline{M6},\ \underline{M7},\ \underline{M8},\ \underline{M9},\ and\ \underline{M10} \quad (38)$$

*Transfer from sequence number staticizer to preceding bit memory*

It will be seen from the foregoing description of the writing in of a new sequence number into the SEQUENCE NUMBER STATICIZER that the resetting circuits for any of the toggle circuits M6–10 are operable during the same timing pulses as those at which outputs from the 1 side of these toggle circuits would be fed into the PRECEDING BIT MEMORY. In order to prevent the confusion of numbers which would arise if information was read out from a toggle circuit in the staticizer at the instant at which it was being reset, circuits are provided which make the output signal from any of these toggle circuits dependent upon the absence of a resetting condition. In each case, except for the toggle circuit M5 which is not reset, the output of the toggle circuit is transmitted only in the absence of all the signals which are used in resetting that particular toggle circuit during the search for the highest priority sequence number. Thus, toggle circuit M6, which is reset by the signals M3 and $\underline{M5}$ together, is only allowed to apply a signal to toggle circuit M4 during the timing pulse TA20 in the absence of either of the signals M3 or $\underline{M5}$. It is convenient to provide gating circuits which are dependent upon the presence of signals $\underline{M3}$ and M5 for this purpose, the two gates being G93 and G40. The circuits are:

$$M5 \cdot M6 \cdot TA20—M4 \quad (39)$$

$$\text{and } \underline{M3} \cdot M6 \cdot TA20—M4 \quad (40)$$

Similar circuits are required to control the transmission of a signal from toggle circuit M7 back to toggle circuit M3 in the PRECEDING BIT MEMORY, but in this case a further condition is introduced, in that the toggle circuit M7 can also be reset by the set condition of toggle circuit M12 in the RESET CIRCUIT. In addition, therefore, to the absence of either the signals $\underline{M6}$ or M4, both conditions must also include the absence of the signal M12. The two circuits, comprising gates G41 and G42, which fulfil these conditions are:

$$M6 \cdot M7 \cdot \underline{M12} \cdot TA21—M3 \quad (41)$$

$$\text{and } M4 \cdot M7 \cdot \underline{M12} \cdot TA21—M3 \quad (42)$$

Two similar circuits are provided for each of the remaining toggle circuits in the staticizer, these being:

$$M7 \cdot M8 \cdot \underline{M12} \cdot TA22—M4 \quad (43)$$

$$\underline{M3} \cdot M8 \cdot \underline{M12} \cdot TA22—M4 \quad (44)$$

$$M8 \cdot M9 \cdot \underline{M12} \cdot TA23—M3 \quad (45)$$

$$\underline{M4} \cdot M9 \cdot \underline{M12} \cdot TA23—M3 \quad (46)$$

$$M9 \cdot M10 \cdot \underline{M12} \cdot TA24—M4 \quad (47)$$

$$\text{and } M3 \cdot M10 \cdot \underline{M12} \cdot TA24—M4 \quad (48)$$

the gate circuits involved being G43–48. Since toggle circuit M5 is not reset during the search for sequence numbers, this output requires no special gating arrangements other than its characteristic timing pulse, the gate circuit for this, G49, being simply:

$$M5 \cdot TA19—M3 \quad (49)$$

The reset toggle circuit M12 is reset if required after the examination of the SEQUENCE NUMBER STATICIZER in each word, upon the occurence of pulse TA27, in circuit:

$$M12 \cdot TA27—\underline{M12} \quad (50)$$

the gate involved being G50.

It may finally be mentioned that the sequence number stored in the SEQUENCE NUMBER STATICIZER at the end of the revolution of the drum is read out during a subsequent revolution under the control of the toggle circuit M11, which is the MULTIPLE APPEARANCE LINE STATICIZER. This toggle circuit is first set when a multiple appearance line marking is read from any library track, provided that the toggle circuit M1 in the LINE DISCRIMINATOR of the same sub-group is in the set condition, indicating that a free line with the wanted group number is being scanned. The read circuit for a library track is designated RC3, and the circuit for setting the toggle circuit M11 is:

$$RC3 \cdot M1 \cdot TA18\text{—}M11 \qquad (51)$$

the gate circuit involved, which is the MULTIPLE APPEARANCE LINE DETECTOR, is G51. The toggle circuit M11 is reset by the general reset signal after the information in the SEQUENCE NUMBER STATICIZER has been read, in the circuit:

$$GRL\text{—}\underline{M11} \qquad (52)$$

What we claim is:

A circuit arrangement for selecting the highest value number from a plurality of binary numbers comprising a first storage device for storing said binary numbers in a plurality of groups, means for reading corresponding binary numbers of all said groups simultaneously from said first storage device in serial form from the highest order binary digit to the lowest, a second storage device for storing the highest binary number previously read, an individual circuit provided for each group of numbers stored on said first storage device and to which the numbers of the appropriate group are applied as they are read, each said individual circuit including a first memory device for remembering a previous binary digit read, a circuit common to all said individual circuits, said common circuit including a second memory device for remembering the highest value digit previously read from all the groups and for remembering the value of the current binary digit of the number stored in said second storage device whereby a "1" digit applied to an individual circuit is passed to said common circuit firstly if said first memory device indicates that the previous binary digit was "1" and secondly if said first memory device indicates that the previous binary digit was "0" and said second memory device indicates that the digit previously read from all the groups was "0" said common circuit being rendered effective on a "1" digit being passed thereto from an individual circuit only if said second memory device indicates that the current binary digit in said second storage device is "0" and means in said second storage device responsive to the effective condition of said common circuit for replacing the current binary digit "0" in the second storage device by the binary digit "1" for changing the value of the subsequent binary digits in said second storage device to "0" to enable a new number to be stored therein.

References Cited by the Examiner

UNITED STATES PATENTS

| | | | |
|---|---|---|---|
| 2,723,312 | 11/55 | McGuigan et al. | 179—7 |
| 2,764,634 | 9/56 | Brooks et al. | 179—18 |
| 2,771,595 | 11/56 | Hendrickson et al. | 179—18 |
| 2,852,613 | 9/58 | Faulkner | 179—18 |
| 2,901,732 | 8/59 | Canning | 340—146.2 |
| 2,958,850 | 11/60 | Glenner et al. | 179—18 |

MALCOLM A. MORRISON, *Primary Examiner.*

L. MILLER ANDRUS, ROBERT H. ROSE, *Examiners.*